Dec. 17, 1957 H. M. RUTH 2,816,647
ARTICLE TIMING AND SPACING CONVEYOR
Filed Feb. 9, 1953 7 Sheets-Sheet 1
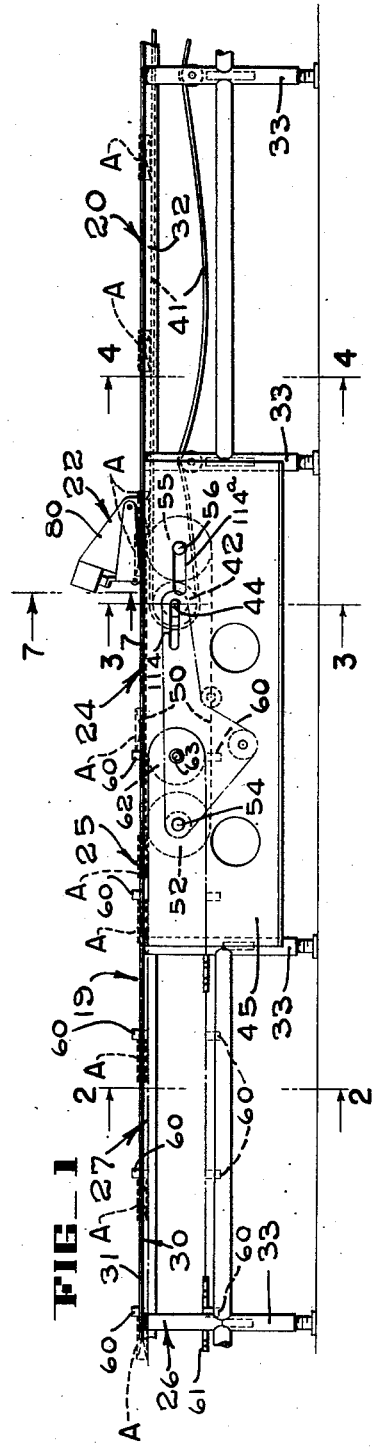
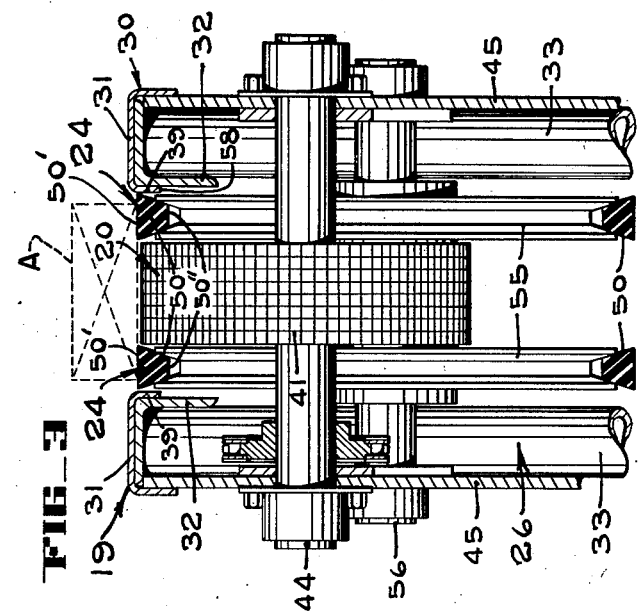
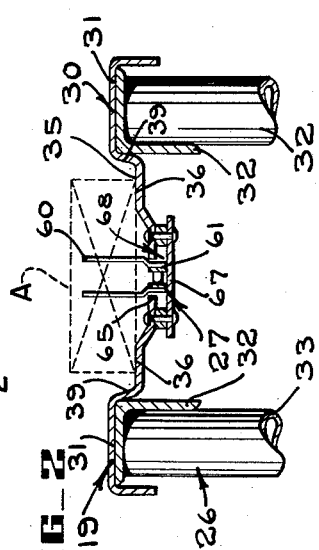
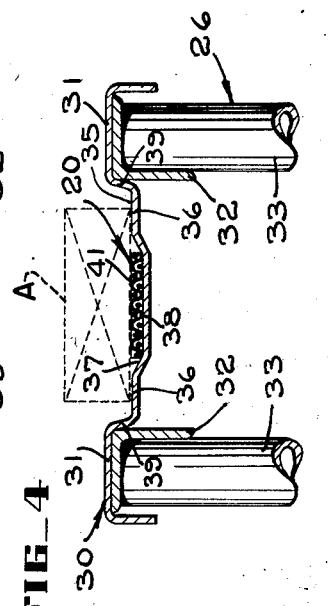
INVENTOR
HAROLD M. RUTH
BY *Hans G. Hoffmeister*
ATTORNEY Dec. 17, 1957　　　　H. M. RUTH　　　　2,816,647
ARTICLE TIMING AND SPACING CONVEYOR
Filed Feb. 9, 1953　　　　　　　　　　7 Sheets-Sheet 2
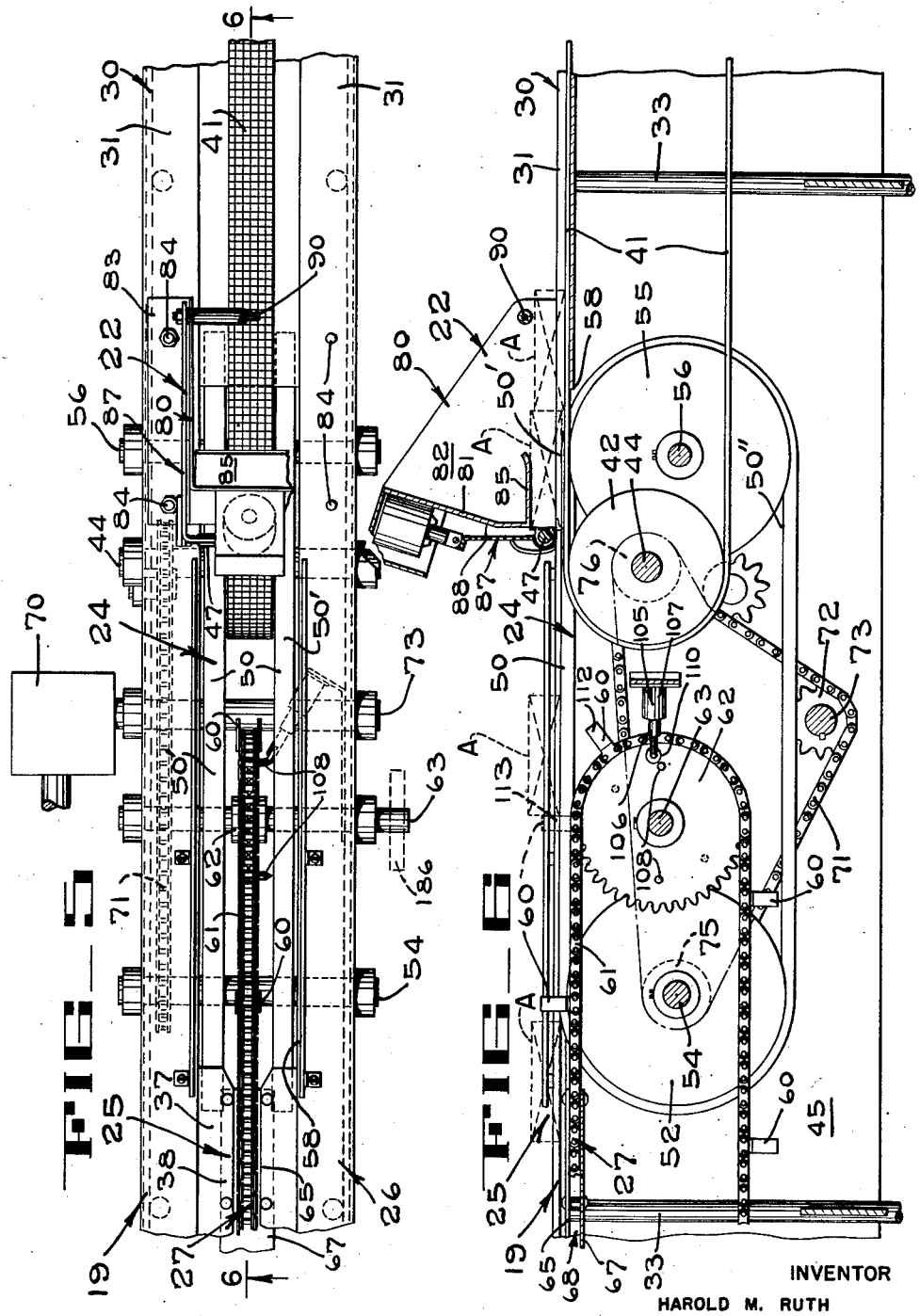
INVENTOR
HAROLD M. RUTH

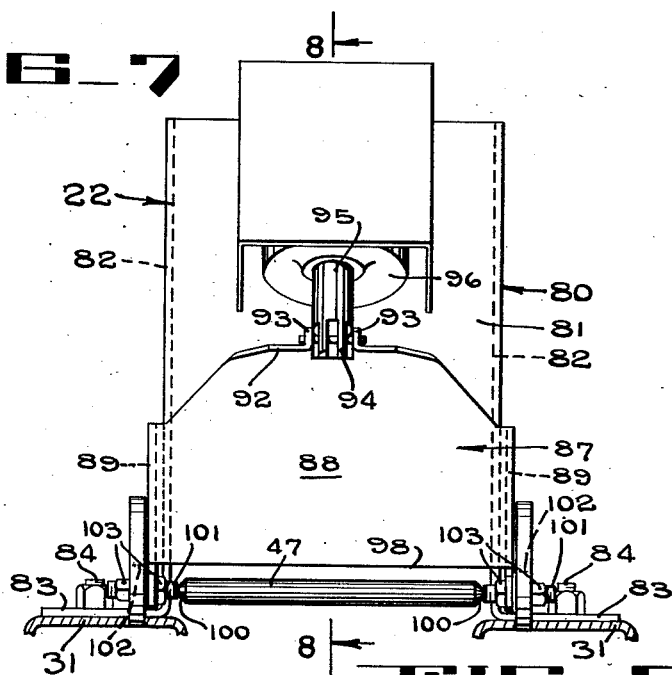
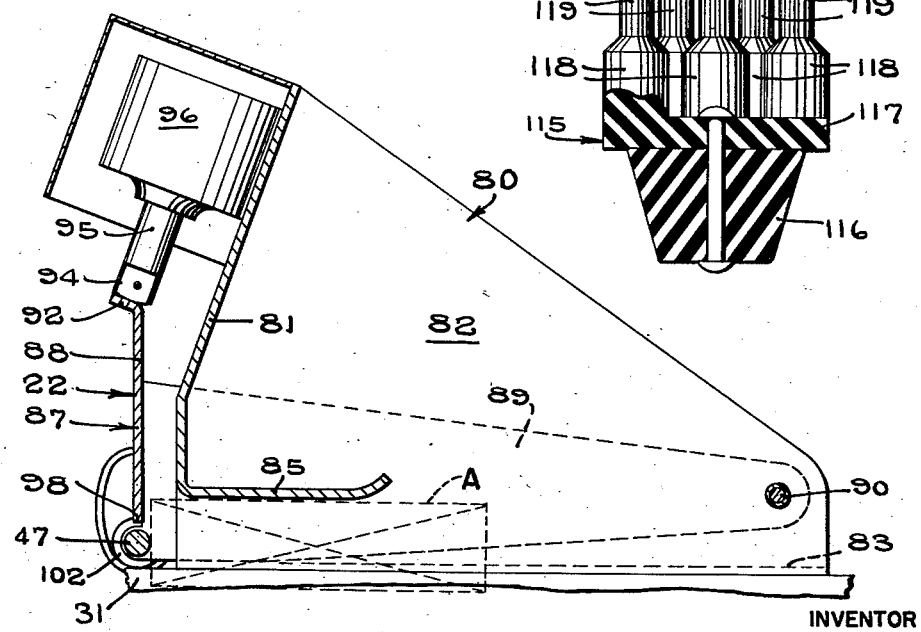

Dec. 17, 1957          H. M. RUTH          2,816,647
ARTICLE TIMING AND SPACING CONVEYOR
Filed Feb. 9, 1953          7 Sheets–Sheet 4
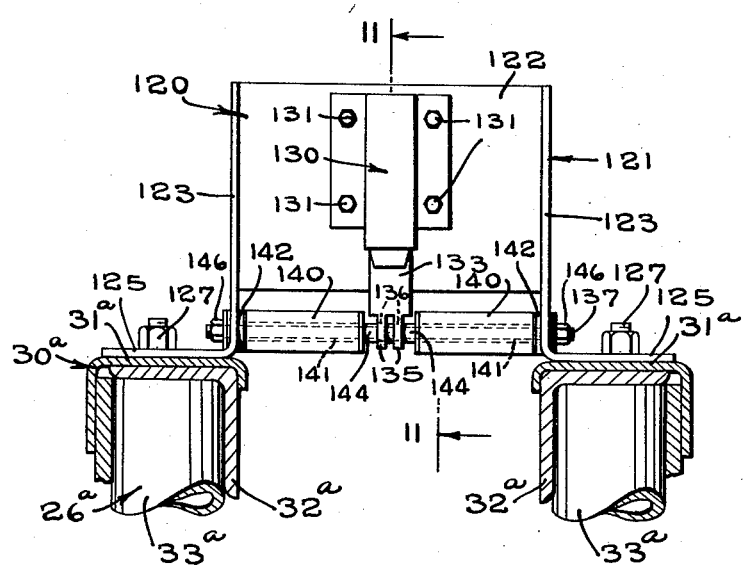
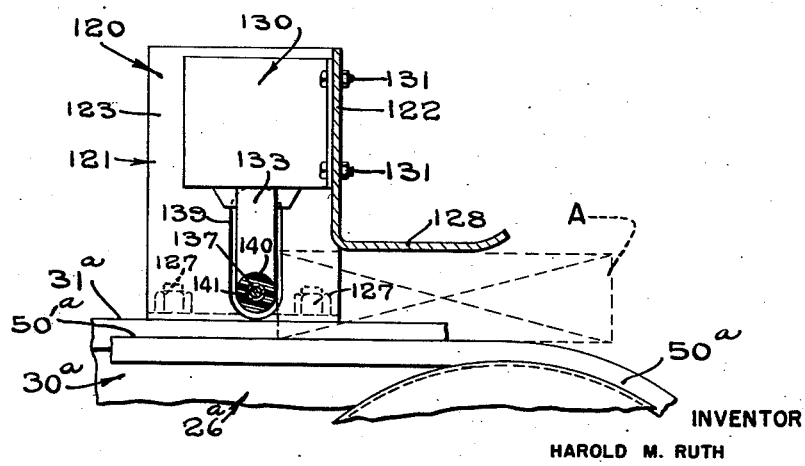
INVENTOR
HAROLD M. RUTH
BY *Hans G. Hoffmeister*
ATTORNEY Dec. 17, 1957  H. M. RUTH  2,816,647
ARTICLE TIMING AND SPACING CONVEYOR
Filed Feb. 9, 1953  7 Sheets-Sheet 5
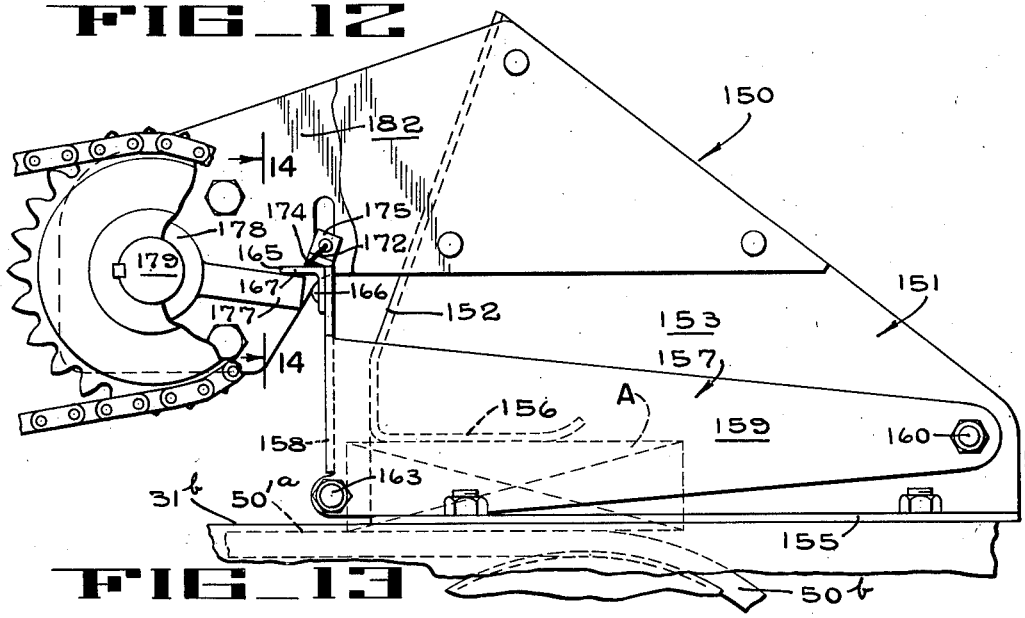
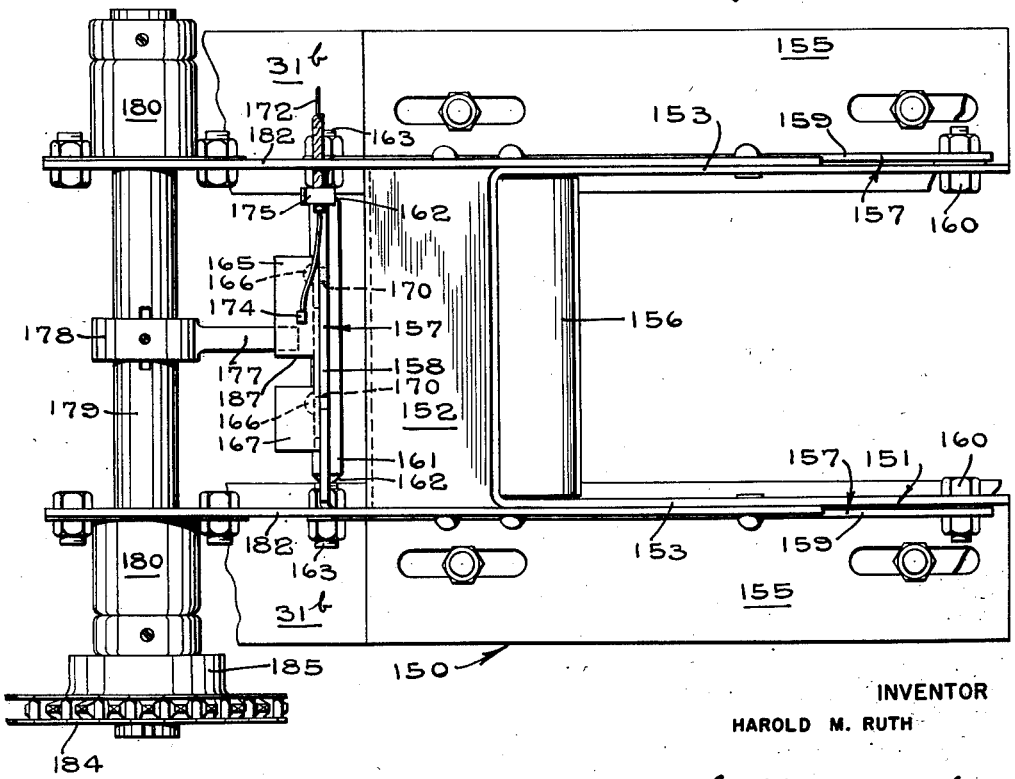
INVENTOR
HAROLD M. RUTH
BY
ATTORNEY

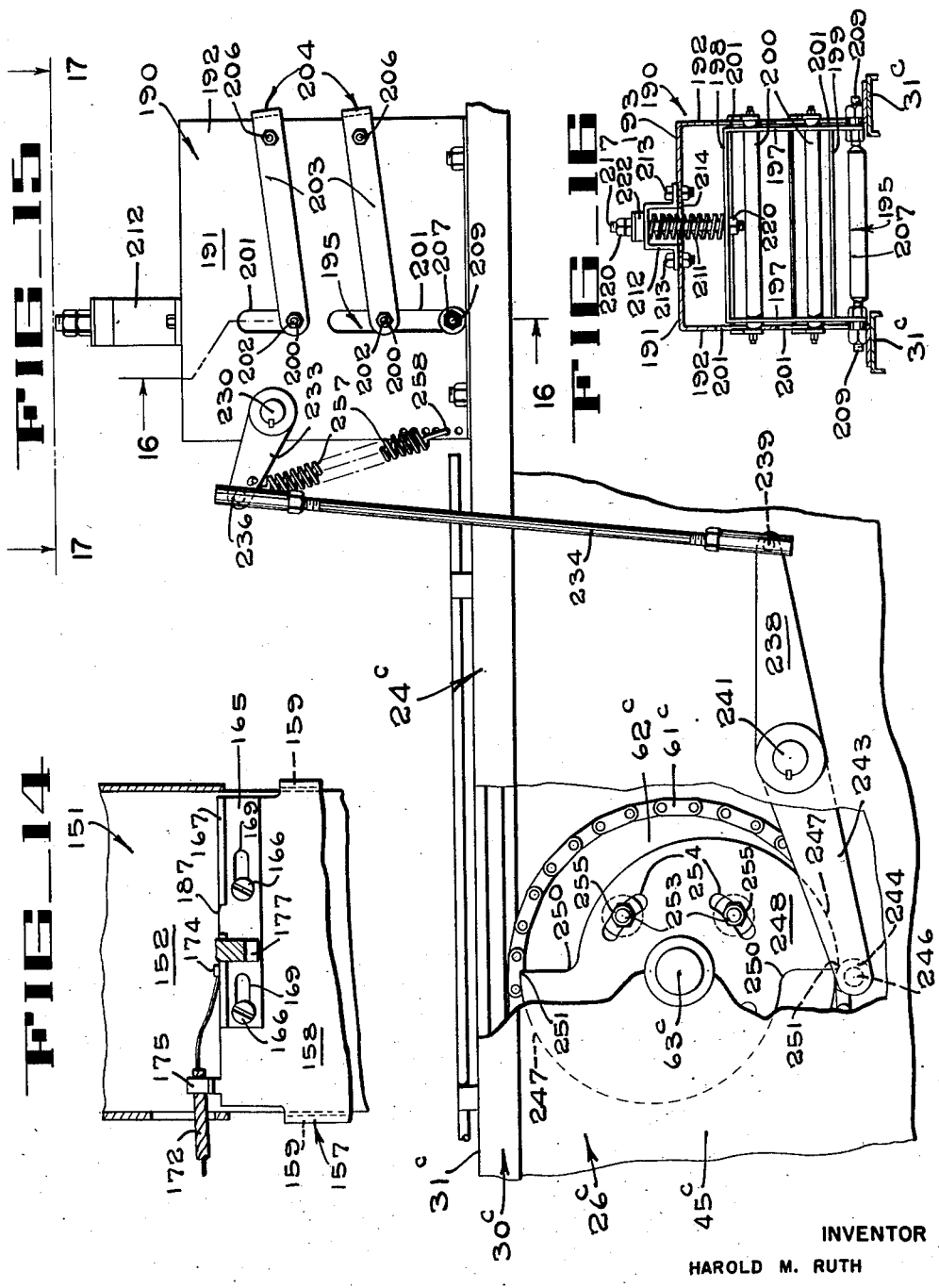

Dec. 17, 1957 H. M. RUTH 2,816,647
ARTICLE TIMING AND SPACING CONVEYOR
Filed Feb. 9, 1953 7 Sheets-Sheet 7
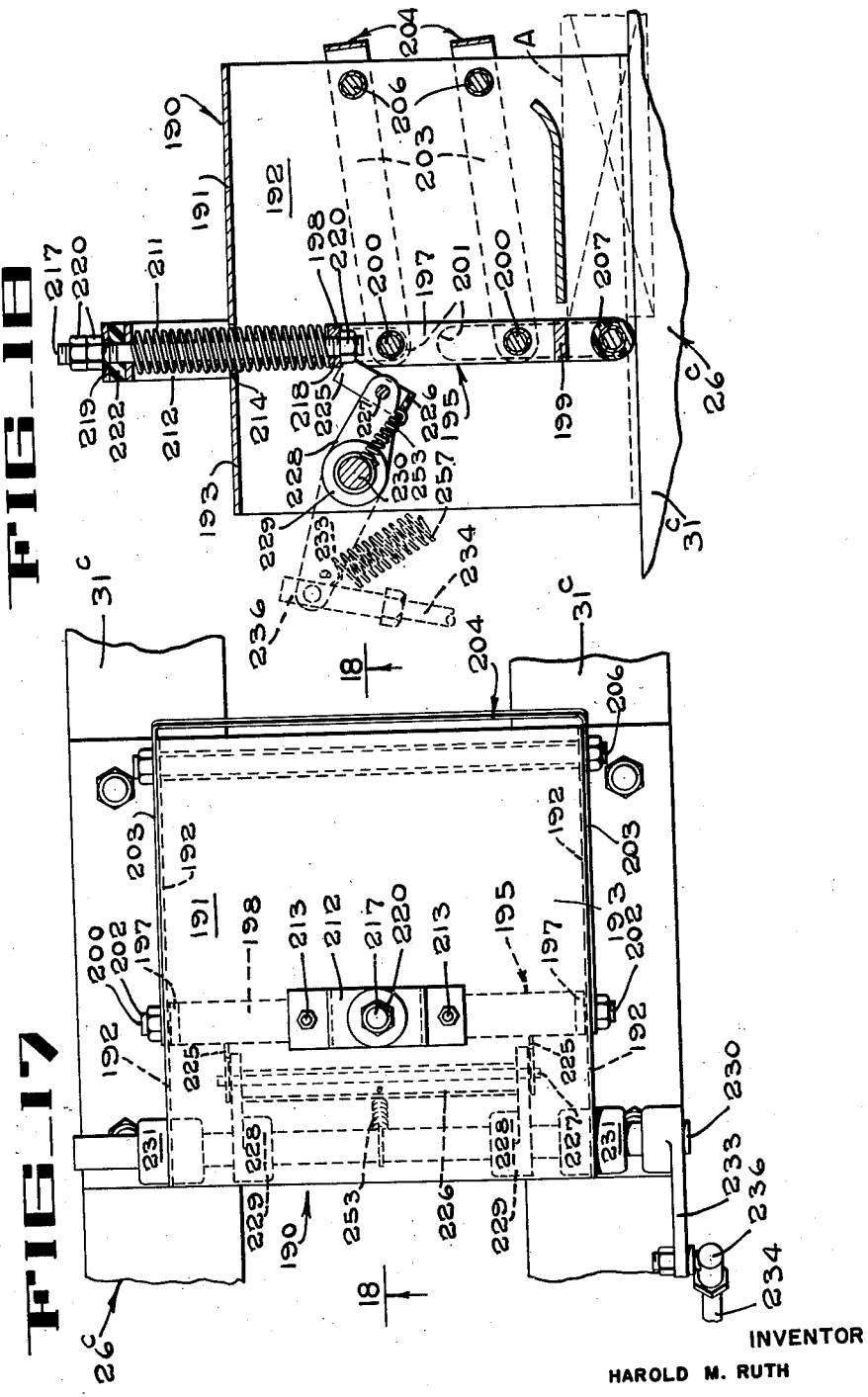
INVENTOR
HAROLD M. RUTH
BY Hans G. Hoffmeister
ATTORNEY United States Patent Office 2,816,647
Patented Dec. 17, 1957

2,816,647
ARTICLE TIMING AND SPACING CONVEYOR

Harold M. Ruth, San Jose, Calif., assignor to Food Machinery and Chemical Corporation, San Jose, Calif., a corporation of Delaware Application February 9, 1953, Serial No. 335,969
18 Claims. (Cl. 198—34)

This invention relates to conveyors for delivering articles to a processing station or machine and more particularly, pertains to an improved timing and feeding mechanism for controlling the spacing between consecutive articles as they are conveyed along a predetermined path.

It is an object of the present invention to provide a conveyor which is arranged to receive articles placed thereon in random order and to deliver the articles consecutively to a processing station at equally spaced intervals.

Another object of the invention is to provide an improved article timing the feeding mechanism for a conveyor.

A further object is to provide an improved article feeding conveyor that is simple in construction and efficient in operation.

Other and further objects and advantages of the present invention will become apparent from the following detailed description taken in connection with the accompanying drawings, in which:

Fig. 1 is a side elevation of an article feeding conveyor provided with an article spacing mechanism constructed according to the teachings of the present invention.

Fig. 2 is a vertical section taken on line 2—2 of Fig. 1.
Fig. 3 is a vertical section taken on line 3—3 of Fig. 1.
Fig. 4 is a vertical section taken on line 4—4 of Fig. 1.
Fig. 5 is a fragmentary plan view of the conveyor of Fig. 1.
Fig. 6 is a vertical section taken on line 6—6 of Fig. 5.
Fig. 7 is an enlarged vertical section taken on line 7—7 of Fig. 1.
Fig. 8 is a vertical section taken on line 8—8 of Fig. 7.
Fig. 9 is a transverse section of a modified transfer belt adapted for use in the article conveyor of the present invention.
Fig. 10 is an enlarged vertical section, similar to Fig. 7, but showing a modified, electrically operated article spacing device.
Fig. 11 is a vertical section taken on line 11—11 of Fig. 10.
Fig. 12 is a fragmentary side elevation, partly broken away, of a mechanically actuated article spacing device that may be used on the article conveyor of the present invention.
Fig. 13 is a fragmentary plan view of the article spacing device of Fig. 12.
Fig. 14 is a vertical section taken on line 14—14 of Fig. 12.
Fig. 15 is a fragmentary side elevation, with parts broken away, of a second mechanically actuated spacing device for use with the article conveyor of the present invention.
Fig. 16 is a vertical section reduced in size and taken on line 16—16 of Fig. 15.
Fig. 17 is a fragmentary plan view of the spacing device of Fig. 15, taken in the direction of arrows 17—17 of Fig. 15.
Fig. 18 is a vertical section taken on line 18—18 of Fig. 17.

In Fig. 1, the reference numeral 19 indicates generally a conveyor arranged to receive articles, such as cartons of food, at a loading station (not shown) associated with the end of the conveyor at the right of Fig. 1, and move them toward the left end which is adapted to discharge the articles to a processing machine, such as for example, a quick-freeze unit. The conveyor 19 comprises a first conveying section 20 at the right hand end on which articles are placed in irregular or random order on a conveying surface and are moved consecutively to an article spacing mechanism 22, a second conveying section 24 in which each article is picked up as it is released from the spacing mechanism 22 and moved at an increased rate of speed to a waiting station 25 and to a third conveying section 27 in which the articles are picked up from the waiting station 25 and moved at regularly spaced intervals to a discharge station.

The conveyor 19 comprises a frame 26 which includes an elongated continuous top support plate 30 (Figs. 1 and 2) preferably made of pressed steel and provided with a longitudinal flange 31 on each side supported on longitudinally extending angle bars 32. The bars 32 are welded to the top surfaces of a plurality of longitudinally and laterally spaced upright posts 33. In transverse cross-section, as seen in Fig. 4, the support plate 30 has the configuration of a trough having an upper depressed portion 35, the base of which is defined by two spaced flat support plates 36, and a lower depressed portion 37 having a bottom wall 38. Upright opposed side walls 39 form guide surfaces for an article "A" moving along the plate.

Articles "A" are carried through the first conveying section 20 by means of an endless supply belt 41 (Fig. 3), of wire mesh construction, trained around a drive pulley 42 (Figs. 1 and 6), which has a suitable surface for engaging the belt in frictional driving relation, and an idler pulley (not shown). The drive pulley 42 is keyed to a shaft 44 which is journalled for rotation in side plates 45 (Fig. 3) that are rigidly mounted on each side of the conveyor frame on the support posts 33 throughout the second conveying section 24. It will be noted in Fig. 4 that the top surface of the wire belt 41 is spaced slightly above the upper surface of the flat support plates 36 so that, in the first conveying section, the article is supported by the belt 41 which, itself, travels in the lower depressed portion 37 of the conveyor trough.

Each article "A" is moved by the belt 41 into engagement with a stop roller 47 (Fig. 6) which is mounted for vertical movement into and out of the path of travel of the article. When the roller 47 is disposed in its lowermost position, i. e., in article-arresting position, it temporarily arrests the forward movement of the article in a manner and for a purpose which will be described more fully presently.

Just before the article reaches the stop roller 47 it is lifted off the wire mesh supply belt 41 by two transfer belts 50 (Figs. 3, 5 and 6) which are disposed on either side of the supply belt 41. Each transfer belt has a conveying surface 50' made of a material, such as rubber, that has a high coefficient of friction to assure efficient lifting of the article off the supply belt. The lower body portion 50" of each transfer belt 50 is of V-shape and is trained between a grooved head pulley 52 (Fig. 6) keyed to a drive shaft 54 and a grooved tail pulley 55 keyed to an idler shaft 56. Both shafts 54 and 56 are journalled for rotation in the side plates 45. The top support plate 30 of the conveyor frame 26 has an elongated rectangular opening 58 (Figs. 3 and 5) in the central conveyor section 24 which permits the wire belt 41 of the first conveyor section 20 to pass downwardly around its drive pulley 42 for return rearwardly to the associated idler pulley (not shown) beneath the support plate 30. This opening 58 also permits the two spaced transfer belts 50 to be mounted so that their upper, conveying surface 50' is at a level above the top conveying surface of the wire mesh belt 41. Thus as seen in Fig. 3, when an article reaches the zone, wherein the belts 41 and 50 are coextensive longitudinally of the conveyor frame, the article will be raised up off the wire mesh belt 41 by the transfer belts 50. Immediately after the article is raised off the wire belt 41, its forward movement is arrested by the stop bar 47 of the spacing mechanism 22. The article is held in this arrested position by the stop roller 47 while the continuously moving transfer belts 50 slide along under the stationary article. When the article is released by the stop roller, the transfer belts 50 advance the article to a point, past the forward end of the opening 58 in the support plate, to the waiting station 25 where it is deposited on the spaced flat support plates 36, as shown in Fig. 2. In this stationary position, the article is in the path of movement of upstanding lugs 60 (Fig. 6) secured to an endless pusher chain 61 trained over a rearward idler sprocket 62 keyed to a shaft 63 rotatably journalled in the sideplates 45. At its forward end (not shown), the chain 61 is trained around a drive sprocket that is connected to a power source associated with the machine or unit to which the articles are being delivered.

In the third or discharge conveying section 27, an elongated slot 65 (Figs. 2 and 5) is provided in the bottom wall 38 of the lower depressed portion 37, and a support plate 67 is secured to the bottom wall 38 in spaced relation below the slot 65 to provide a trough 68 in which the chain 61 is guided and supported as it moves the articles to the discharge station. It will be apparent that, since the lugs 60 on the chain 61 are disposed at equally spaced intervals, the articles picked up by the lugs will be equally spaced when they reach the discharge or storing station.

The transfer belts 50 and the wire mesh supply belt 41 are driven in timed relation from a power unit 70 (Fig. 5) through a drive chain 71 (Fig. 6) which engages a sprocket 72 keyed to a power take-off shaft 73 of the unit 70. The chain 71 is also trained over a sprocket 75 keyed to the transfer belt shaft 54 and over a sprocket 76 keyed to the supply belt drive shaft 44. Since the transfer belt pulley 52 is larger in diameter than the supply belt pulley 42, the transfer belts 50 have greater linear velocity than the supply belt 41. As will appear presently, this greater linear speed permits the transfer belts to rapidly move an article away from the spacing device 22 so that a gap is formed between the rear of the article and the next following article into which the stop roller 47 of the spacing device is dropped to temporarily detain the following article. The power unit 70 is provided with a suitable speed regulating device (not shown) for varying the speed of the take-off shaft 73.

Straddling the wire mesh supply belt 41 and a portion of the accelerating V-belts 50 is the article spacing device 22. This device comprises a generally U-shaped stationary housing 80 (Figs. 7 and 8) having a front wall 81 and two spaced side wall portions 82 extending rearwardly from the front wall. Laterally disposed flanges 83 extend outwardly from the base of each side wall 82 for securement by bolts 84 to the top flanges 31 of the frame support plate 30. The lower portion 85 (Fig. 8) of the front wall 81 is bent upwardly and rearwardly into a position substantially parallel to the support plates 36 to provide an article retaining upper wall which prevents upward tipping or movement of the article as it is released by the stop roller 47. A generally U-shaped gate 87 is disposed around the U-shaped housing 80. The gate has a front wall 88 and two side arms 89 that extend rearwardly for pivotal mounting on a rod 90 secured between the side walls of the housing above the level of the retainer wall 85. The front wall 88 of the gate 87 is extended upwardly to form an angularly disposed flange 92 (Fig. 7). Ears 93, formed on the flange 92, provide a pivotal connection with the lower end 94 of the movable core 95 of a solenoid 96 secured to the front wall 81 of the stationary housing 80. The lower portion of the front wall 88 of the gate 87 is cut away at 98 (Fig. 7) to form an opening across which the carton-contacting stop roller 47 is rotatably mounted. The roller 47 has conical ends 100 fitted within threaded studs 101 that are secured in openings in the side arms 89 of the gate 87. A noise-deadening rubber wheel 102 is locked in place on each stud 100 by lock nuts 103.

Referring to Fig. 6, it will be seen that, when the solenoid 96 is energized, the core 95 will be pulled upwardly, lifting the gate 87 upwardly to a point where the article "A," shown in phantom lines, passes under the roller 47 due to the frictional grip of the continuously moving transfer belts 50 on which the article rests. When the solenoid 96 is deenergized, the gate roller 47 immediately drops down by gravity toward normal position and rides along the top of the carton being advanced and finally into the space behind the advancing carton and ahead of the next following carton.

The energization of the solenoid 96 is controlled by a micro-switch 105 (Figs. 5 and 6) to which it is electrically connected. The micro-switch 105 is a well known commercial type having electrical contacts which are arranged to be closed when a plunger 106 is pushed into the switch housing 107 by the contact of a pin 108, projecting from the side face of the discharge belt tail sprocket 62, with a roller 110 on the end of the plunger 106. When the pin 108 releases the roller 110, the plunger 106 is automatically moved outwardly of the housing to open the contacts and de-energize the solenoid 96. In the present invention, the positions of the pins 108 on the sprocket 62 are coordinated with the positions of the upstanding lugs 60 on the pusher chain 61, trained over the sprocket 62, so that the solenoid 96 will be energized and an article released each time a lug 60 reaches the full line position indicated by the reference numeral 112 (Fig. 6). When the lug reaches the dotted line position, indicated by reference numeral 113 the article will be in position to move into abutting contact with the rear face of the lug 60. As mentioned hereinbefore, each lug engages an article previously deposited in front of it at the waiting station 25 and moves it toward the discharge station. Therefore, by coming between the previously deposited article and the article just released by the gate, each lug positively prevents a piling up of the articles at the waiting station, which might occur due to the high speed of the transfer belts 50.

In operation, articles placed at random on the surface of the feed belt 41 are moved along by the belt until the leading article is carried up onto the transfer belts 50 and its movement is arrested by the stop roller 47 of the spacing device 22. Soon thereafter, one of the pins 108 on the sprocket 62 trips the microswitch 105 to energize the solenoid 96 and effect the raising of the gate 87. This releases the article and the same is moved rapidly forwardly by the relatively fast transfer belts 50 into position abutting the rear face of one of lugs 60, on the chain 61. The lug and the article move along together until the article leaves the transfer belts 50 and is deposited at the waiting station 25 where it will be engaged by the next lug on the chain.

It will, therefore, be apparent that the article feeding conveyor herein disclosed is capable of delivering articles in equi-spaced relation to a discharge station regardless of whether the articles are placed on the wire mesh supply belt 41 in a solid line of end-to-end articles, a line of equi-spaced articles, or an interrupted line of unequally spaced articles.

In a preferred arrangement the pusher chain 61 may be operated at substantially the same linear speed as the wire mesh supply belt 41. This speed will, of course, be less than the speed of the transfer belts 50. It is also within the scope of the present invention to operate the discharge belt 61 faster than the supply belt, but slower than the transfer belts 50. In Fig. 1, it will be noted that the shafts 44 and 56 pass through slots 114 and 114a, respectively, in the side walls 45. These slots permit the adjustment of the position of the shafts to accommodate articles of different lengths.

The conveying surface 50a of the transfer belt 50 may be made of any material having the capacity to frictionally grip the surface of the articles being conveyed. Fig. 9 illustrates a cross-section of a transfer belt 115 particularly adapted to grip articles having paper wraping thereon. This transfer belt 115 comprises a standard V-belt 116 to which is riveted a molded, pliable rubber belt 117 consisting of a flat section and a plurality of upright, staggered members 118 having flexible, cylindrical portions 119 with gripping surfaces. In addition to the high coefficient of friction of the rubber surfaces, this type of belt surface is especially advantageous for cartons coated with wax because of its non-clogging characteristics due to the spacing of the members 118. A firm grip is maintained on the articles at all times insuring immediate acceleration of the article as it rides up onto the transfer belts 50 from the low-speed supply belt 41.

In the following descriptions of three modified forms of the article spacing device 22, it will be understood that each modified device is to be used with the conveyor 25 as described hereinbefore with the exception that mechanically actuated forms of the device will have a drive connection that will be set out in detail. Further, in the following descriptions of the three modifications, parts which are similar to the parts described in connection with Figs. 1 to 8, inclusive, will be given the same reference numerals as in Figs. 1 to 8, inclusive, followed by the suffix "a" for the first modification, "b" for the second modification and "c" for the third modification.

In Figs. 10 and 11, a modified electrically controlled article-spacing device 120 is illustrated.

This spacing device comprises a housing 121 having a rear upright wall 122 extending transversely of the conveyor frame. Side walls 123, integrally formed with the rear wall 122, extend forwardly thereof and have laterally extending flanges 125 at the lower end of the walls which are adapted to be secured to the horizontal support plates 31a of the conveyor frame 26a by bolts 127. The lower portion of the rearwall 122 is bent rearwardly and upwardly to provide an overhanging article-retaining wall 128. A solenoid 130, mounted by bolts 131 on the forward face of the rear wall 122, has a core 133 disposed for sliding vertical movement therein. At its lower end the core 133 has two depending ears 135 (Fig. 10) with aligned holes 136 therethrough. An elongated stud bolt 137 extends through said holes and through vertical slots 139 (Fig. 11) in the opposed side walls 123 and has threaded end portions terminating exteriorly of the side walls. On each side of the core ears 135, a nylon roller 140 is mounted on a brass sleeve 141 which is journalled on the stud 137. A relatively short nylon roller 142 (Fig. 10) is mounted adjacent each nylon roller 140 on a short brass sleeve (not shown). Each short roller 142 is disposed in the vertical slot 139 in one of the side walls of the housing. Spacer sleeves 144 are disposed between each solenoid ear 135 and the adjacent roller 140, and nuts 146, on the threaded ends of the bolt, lock the rollers on the bolt.

The solenoid 130 is adapted to be electrically connected to the microswitch 105 mounted on the conveyor frame as explained in connection with the solenoid 96 of Fig. 8. It is to be particularly noted that the modified article spacing device of Figs. 10 and 11 has a direct acting mechanism which eliminates the necessity of a pivotally mounted gate. In operation, when the solenoid 130 is energized, the core 133 moves upwardly lifting the nylon rollers upwardly along the forward face of the article detained by the spacing device. When the rollers are elevated sufficiently, the article is moved forwardly by the transfer belts 50a. When the solenoid is de-energized, the rollers immediately descend by gravity onto the top surface of the article and roll therealong until they drop into the space behind the article to arrest the forward movement of the article next behind.

In Figs. 12, 13 and 14, a mechanically actuated article-spacing mechanism 150 is illustrated. This device comprises a generally U-shaped stationary housing 151 (Fig. 12) having an upright front wall 152 and two spaced side walls 153 extending rearwardly from the front wall 152. Laterally disposed flanges 155 extend outwardly from the base of each side wall for securement to the top plates 31b of the frame support plate. The lower portion of the front wall 152 is bent upwardly and rearwardly to form an overhead article-retaining wall 156. A generally U-shaped gate 157 (Fig. 12) is disposed around the U-shaped housing 151. The gate 157 has a front wall 158 and two side arms 159 that extend rearwardly and are pivotally mounted on the side walls 153 by bolts 160. A stop roller 161 (Fig. 13) having conical ends 162 journalled in studs 163 extending from the side walls of the gate, is disposed at the lower end of the front wall of the gate. An angle bar 165 is mounted by capscrews 166 near the upper edge of the front wall 158, with a horizontal ledge 167 (Fig. 12) extending forwardly therefrom. Each capscrew 166 passes freely through a horizontal slot 169 (Fig. 14) in the angle bar 165 and is threadedly engaged in a tapped opening 170 (Fig. 13) in the front wall of the gate with the head of the capscrew spaced a distance from the wall sufficient to permit the angle bar to be slid sidewise by means of a flexible cable 172. The cable 172 is secured to a tab 174 (Fig. 14) on the ledge and is guided in an opening in an upstanding ear 175 on the front wall 158.

The gate 157 is raised by means of an actuating arm 177 (Figs. 12 and 13) which is integrally formed on a collar 178 keyed to a shaft 179 journalled for rotation in bearing assemblies 180 (Fig. 13) mounted on the forward end of spaced support plates 182, one of which is riveted to each side wall 153 of the stationary housing 151 and projects forwardly therefrom. The shaft 179 is driven by means of a chain 184 which is trained over a sprocket 185 (Fig. 12) keyed to the end of the shaft 179 and a sprocket 186 (shown in dot-dash lines on Fig. 5) which is keyed to the end of the shaft 63 (Fig. 6) to which the tail sprocket 62 of the discharge pusher chain 61 is secured for rotation therewith. When the shaft 179 is rotated in a counterclockwise direction (Fig. 12), the actuating arm 177 approaches the underside of the ledge 167 and lifts the gate 157, pivoting it about the bolts 160. When the gate is raised sufficiently high, the article "A" under the retainer wall 156 is moved forwardly by the high speed transfer belts 50b. As soon as the actuating arm 177 rides out of contact with the ledge 167, the gate drops by gravity and the roller 161 rides along the top surface of the article until it drops into the gap behind the same to arrest the forward movement of the next advancing article.

Since the chain 61 of the discharge conveying unit 27 and the chain 184 that rotates the actuating arm 177 are driven from the same shaft 63, they move in timed relation to each other. By properly choosing the sprockets, an arrangement may be obtained whereby the gate 157 will be lifted as each lug 60 of the discharge conveyor approaches the full line position 112 shown in Fig. 6. The transfer belts 50b will then move the article into abutting position against the rear face of the lug 60, when the lug reaches the dotted line position 113 of Fig. 6.

If for any reason it becomes desirable to temporarily discontinue the release of articles from the spacing device 150, the cable 172 may be pulled to the left, as seen in Fig. 14, by any suitable actuating means, to align the actuating arm 177 with a notch 187 cut in the ledge 167. When feeding of articles to the discharge conveyor is to be resumed, the cable is pushed to the right so that a solid portion of the ledge will again be in the path of travel of the actuating arm 177.

The article spacing device 150 is positive in action, is arranged to accurately time the release of each article with the movement of a lug on the discharge conveyor chain, and, in addition, is provided with convenient means for temporarily deactivating the spacing device so that an extra long spacing may be obtained at the discharge station.

In Figs. 15, 16, 17 and 18, a second form 190 of a mechanically-operated article spacing device is illustrated. This device 190 comprises an open-ended housing 191 (Fig. 16) having two upstanding spaced sidewalls 192, and a top wall 193 connecting the sidewalls 192. A gate 195 is disposed for vertical movement in the housing 191. The gate 195 is made up of two spaced upstanding rigid bars 197 connected at their top ends by a cross bar 198 and near their lower ends by a cross bar 199. A gate 195 is pivotally mounted on two vertically spaced rods 200 which extend laterally through vertically disposed slots 201 (Fig. 15) in the housing 191. Exteriorly of the housing, reduced diameter threaded ends 202 of the rods 200 are secured to the forward ends of arms 203 of a pair of yokes 204 that are pivotally mounted on crossbars 206 (Fig. 17). Since the arms of the yokes are parallel and the crossbars 206 are in vertical alignment, the gate 195 is arranged for movement in a vertical path. At the lower end of the gate, a stop roller 207 (Fig. 16) is rotatably mounted with conical ends disposed in sockets in studs 209 secured to the side members 197 of the gate 195. The upward movement of the gate 195 is resisted by a compression coil spring 211 which is disposed between the upper surface of the top cross bar 198 of the gate and the lower surface of an inverted U-shaped bracket 212, secured on the top of the housing by bolts 213, over an opening 214 therein, through which the spring 211 extends. The vertical position of the gate and its roller 207 may be adjusted by means of a stud 217 which is disposed inside the spring 211 and has one threaded end extending through a hole 218 (Fig. 18) in the crossbar 198 of the gate 195 and a second threaded end extending through an opening 219 in the top wall of the bracket 212. Adjustment of the position of the gate may be made by manipulation of nuts 220 disposed on each end of the stud 217. A rubber pad 222, encircling the stud and locked between the nuts and the top of the gate, absorbs any shock due to the lowering of the gate.

The gate 195 is lifted in timed relation with the lugs 60 on the discharge conveyor chain 61 through a pair of spaced latches 225 (Fig. 17) which are secured together by a rigid strap 226. The latches 225 are pivotally mounted on a bar 227 secured in spaced lifter arms 228 which have hubs 229 keyed to a cross shaft 230. The shaft 230 is rotatably journalled in bearings 231 mounted in the housing walls 192 and carries at one end, exteriorly of the housing, an actuating arm 233 which is keyed thereon. An adjustable link 234 (Fig. 15) is connected to the actuating arm 233 by means of a ball and socket joint 236 and to an arm 238 by a ball and sockett joint 239. The arm 238 is keyed to a shaft 241, rotatably journalled in the side plates 45c of the conveyor frame 26c. Interiorly of the side plates, an arm 243 is keyed to the shaft 241 and extends forwardly therefrom. A cam follower roller 244 is rotatably mounted alongside the forward end of the arm 243 on a pin 246 and is arranged to ride along the came surfaces 247 of a cam disc 248. The cam disc is rotatably mounted on the shaft 63c which carries the sprocket 62c over which the pusher chain 61c is trained. The cam disc 248 has two diametrically opposed camming surfaces. Each surface 247 extends in a counterclockwise direction around the shaft from a point relatively close to the center of the shaft 63c at 250 (Fig. 15) and moving angularly around the shaft and in a radial direction progressively further away from the center of the shaft to a point of maximum distance from the shaft at 251, which is 180° further around the shaft. The cam disc 248 is adjustably secured to the sprocket 62c by bolts 253, each of which passes through a hole in the sprocket 62c and a slot 254 in the cam disc 248. By loosening the bolts from their nuts 255, the cam disc may be adjustably rotated relative to the sprocket to thereby vary the timing of the beginning and end of the camming operation.

The cam roller follower 244 is held in contact with one of the camming surfaces 247 by means of a tension spring 257 (Fig. 15) which is anchored at one end in an aperture 258 in the housing 191 of the spacing device 190 and, at the other end, in the outer free end of the arm 233. The spring tends to rotate the arm 233 and shaft 230 counterclockwise causing the shaft 241 to be rotated clockwise and urging the cam follower 244 against the camming surface 247.

During the operation of the conveyor, the cam follower 244 (Fig. 15) will ride up a camming surface 247 to the high point 251 and drop off twice during each rotation of the sprocket 62c. Since the cam disc 248 is secured to the sprocket 62c on which the discharge conveying chain 61c is engaged, the linkage with which the cam follower is associated will be actuated in timed relation to the movement of the lugs 60 on the discharge conveying chain 61 (Fig. 6). In Fig. 15 it will be seen that each time the cam follower 244 drops off the high point 251 as the cam disc and the sprocket 62c are rotated in a counterclockwise direction, the shaft 241 will be rotated in a clockwise direction and the shaft 230 will be rotated in a counterclockwise direction. When the gate is in the lower position, shown in Fig. 18, arresting the forward movement of an article "A," the latches 225 are disposed under the upper cross bar 198 of the gate. The laterally extending rigid strap 226 connecting the latches 225 bears against the underside of the actuating arms 228 and prevents further clockwise pivoting of the latches. Therefore, each time the cam follower drops off the high point on the cam surface, the shaft 230 is rotated counterclockwise and the actuating arms 228 and the latches, acting as rigid links, move upwardly in an arced path lifting the gate upwardly to release the article "A" (Fig. 18) from behind the roller 207. In its upward arced travel, the latches pass out of contact with the gate permitting the gate to drop downwardly by gravity and under the urging of the compressed spring 211 to contact the top of the article. As the cam follower 244 rides up the cam surface once more, the shaft 230 is rotated clockwise. The pivotal mounting of the latches on the bar 227 permits the latches to pass downwardly alongside of the top cross bar 198 of the gate, and, when they are below the cross bar, they are pivoted into latching position therebeneath by a spring 253 disposed between the strap 226 and the shaft 230.

The modified mechanically-actuated article spacing device 190 features a particularly fast acting gate. The rapid upward movement of the gate quickly overcomes any frictional resistance of the roller against the front surface of the article and permits the article to be quickly moved forwardly by the high speed transfer belts 50.

From the foregoing description, it will be apparent that in each form of the article spacing conveyor of the present invention there is provided a simple mechanism for temporarily retarding the forward movement of articles placed at random on a feed conveyor at a loading station and for releasing each article in timed relation with a pusher lug on a conveyor leading to a discharge station. The novel use of a high speed transfer conveyor to quickly accelerate an article, released by the gate, from the article next behind provides a particularly effective means for insuring that the gate will be able to arrest the forward movement of the next article.

It will be understood that modifications and variations may be made without departing from the scope of the present invention.

Having thus described my invention, what I claim as new and desire to protect by Letters Patent is:

1. A conveying system comprising a conveyor arranged to move articles along a predetermined path in end to end relation, a spacing device adjacent said conveyor and having a movable portion adapted to contact the foremost article to arrest the forward movement of the line of articles being advanced by said conveyor, means for moving said movable portion at equally spaced intervals from article arresting position to article releasing position, means including a high speed section of said conveyor disposed below said movable portion and arranged to receive and support the foremost article when said movable portion is in article arresting position for accelerating the foremost article away from the article next behind immediately after the arrested articles are released, and means for effecting the return of said movable portion to article arresting position after only one article has been released thereby.

2. A conveying system comprising a first conveyor arranged to move a line of articles along a predetermined path in end to end relation, a second conveyor arranged to receive articles in end to end relation from said first conveyor and advance them at a linear speed greater than the linear speed of articles on said first conveyor, movable stop means disposed in the path of movement of the articles being advanced by said first conveyor for arresting the forward movement of said articles, said stop means being positioned downstream of the initial point of contact of the articles with said second conveyor to arrest the movement of the articles with only the foremost article being supported on said high speed second conveyor when said movable stop means is in article arresting position, means for moving said stop means out of article-arresting position at equally spaced intervals permitting said high speed conveyor to periodically accelerate the foremost article away from the article next behind immediately after release of the article by said stop means, and means for urging said stop means into the gap behind said foremost article to arrest the advance of the article next behind.

3. Apparatus for spacing conveyed articles comprising a pair of spaced parallel conveying surfaces movable in a horizontal plane and adapted to support and advance articles disposed thereacross, a conveying belt adapted to support articles thereon and having a discharge end disposed between said parallel conveying surfaces, said parallel conveying surfaces being disposed at a slightly higher level than said conveying belt such that articles on said belt are lifted off the belt as they engage said parallel conveying surfaces, releasable stop means disposed in the path of movement of articles being advanced by said parallel conveying surfaces, a pair of spaced elongated stationary support surfaces in alignment with the discharge ends of said spaced parallel conveying surfaces and arranged to receive articles therefrom, an endless chain disposed between and below said support surfaces, and a plurality of spaced lugs secured to said chain and arranged to extend above the level of said support surfaces to engage articles thereon and push them along said support surfaces.

4. Apparatus for spacing conveyed articles comprising a flat elongated stationary support surface, an endless chain mounted adjacent said support surface in a vertical plane, the upper reach of said chain being movable below said surface and parallel thereto, lugs secured in spaced relation on said chain and arranged to extend directly upwardly therefrom in the upper reach of said endless chain, the upper ends of said upstanding lugs being arranged to extend to a point above the level of said support surface and to contact articles thereon, a pair of spaced parallel conveying surfaces arranged to support articles disposed thereacross and having discharge ends adjacent said stationary support surface for depositing articles thereon in the path of movement of said lugs, said parallel conveying surfaces having corresponding portions rearwardly of their discharge ends extending on either side of a portion of said endless chain at a level below the upper ends of said lugs whereby a lug in said portion of said chain presents a rear face to an article advancing on said conveying surfaces and a forward face to an article already deposited on said support surface, and means for coordinating the forward movement of an article on said conveying surfaces with the speed of said endless chain so that the article moves into abutting contact with the rear face of a lug prior to being discharged on said support surface.

5. Apparatus for spacing conveyed articles comprising a first elongated conveying surface arranged to move articles longitudinally thereon, a second elongated conveying surface having an end portion close to said first conveying surface and arranged to receive articles therefrom, means for continuously moving said conveying surfaces, said second surface being movable at a faster linear speed than said first surface, movable stop means normally positioned above said second conveying surface and extending into the path of a line of articles being advanced by said conveying surfaces to arrest the forward movement of said line, said stop means being located on said second conveying surface with relation to the length of the articles being conveyed so that the line will be stopped with the foremost article on the faster moving surface and the following articles on the slower moving surface, said continuously moving conveying surfaces being arranged to slide under the bottom surfaces of the articles in the arrested line, means for moving said stop means out of engagement with said line of articles permitting said high speed conveying surface to move said foremost article away from the following article, and means including the weight of said stop means for returning said stop means to normal article-arresting position ahead of said following article.

6. Apparatus for spacing conveyed articles comprising a first conveying surface arranged to advance articles along a given path, a second conveying surface disposed at a higher level than said first conveying surface and having a rear portion coextensive with the forward portion of said first conveying surface and arranged to receive articles from said first surface and lift them upwardly off said first surface, means for continuously moving said conveying surfaces, said second conveying surface having a speed greater than the speed of said first conveying surface, movable stop means adjacent said second conveying surface and normally disposed to arrest the forward movement of articles being advanced on said second conveying surface with the foremost article resting on said second conveying surface and the following articles disposed on said first conveying surface, a discharge conveyor having a support surface arranged to receive articles from said second conveying surface, a power driven endless chain disposed below said support surface, equally spaced pusher lugs secured to said chain and having ends extending above said support surface to engage articles thereon, and actuating means operably connected to said stop means and to said endless chain for moving said stop means out of engagement with said line of articles after a predetermined linear movement of said chain, permitting said second conveying surface to advance said foremost article onto said support surface in timed relation with a lug on said chain.

7. Apparatus for spacing conveyed articles comprising a support structure, an elongated flat support plate mounted on said structure having an elongated slot extending longitudinally therein, a shaft journalled in said structure below said plate and transversely thereof, a sprocket disposed for rotation on said shaft in a plane extending longitudinally of said plate, a pin secured to and projecting outwardly from the side face of said sprocket, a power driven endless chain engaged over said sprocket and extending longitudinally of said plate immediately below said slot, lugs on said chain arranged when in the upper flight of the chain to extend through said slot to a level above said plate to contact and advance articles supported thereon, a continuously moving conveying surface disposed longitudinally of said plate and arranged to deposit articles on said plate over said slot in the path of movement of said lugs, a stop mechanism mounted on said support structure having a reciprocably mounted member normally disposed in a position obstructing the advance of an article on said continuously moving surface, a solenoid mounted on said support structure and connected to said member to move said member out of article obstructing position upon energization of said solenoid, and a switch mounted on said support structure in a position to be actuated by said lug on said sprocket to close the contacts and energize said solenoid.

8. Apparatus for spacing conveyed articles comprising a first elongated conveying surface arranged to move articles longitudinally thereon, a second elongated conveying surface having an end portion close to said first conveying surface and arranged to receive articles therefrom, releasable stop means disposed adjacent said second conveying surface and arranged to extend into the path of a line of articles being advanced by said conveying surfaces to arrest their forward movement, said stop means being positioned with relation to said end portion of said second conveying surface and with relation to the length of articles being handled so that the foremost article in the arrested line rests on said second conveying surface and the following articles rest on said first conveying surface in said arresting position, means for moving said second conveying surface at a greater speed than said first conveying surface to advance said foremost article at a greater linear speed than the following articles are advanced, and means for releasing said stop means permitting said second conveying surface to accelerate said foremost article away from the following article.

9. A device for controlling the movement of articles along a conveying surface comprising a support structure, a conveying surface arranged to move articles along a predetermined path, a stationary housing supported on said structure and having spaced upstanding sidewalls and a front wall connecting the sidewalls, a rod secured between said sidewalls near the rear end of said housing, a generally U-shaped gate disposed around said housing having side arms pivotally mounted on said rod and a front wall connecting said side arms and disposed forwardly of said housing front wall, an article-contacting member rotatably mounted at the lower end of said gate and normally disposed in the path of travel of an article being advanced on said conveying surface to arrest the forward movement thereof, and a solenoid mounted on said housing above said gate, and connected thereto and arranged to raise said gate upon energization of said solenoid.

10. In combination, a support structure, an elongated flat substantially horizontal support plate mounted on said structure and having an elongated slot extending longitudinally therein, a first shaft journalled for rotation in said support structure below said plate and transversely thereof, a first sprocket keyed to said first shaft and extending longitudinally of said plate, a second sprocket keyed to said first shaft axially displaced from said first sprocket, a power driven chain engaged over said first sprocket and extending longitudinally of said plate immediately below said slot, lugs on said chain arranged when in the upper flight of the chain to extend through said slot to a level above said plate to contact and advance articles supported thereon, a continuously moving conveying surface disposed longitudinally of said plate and arranged to support and advance articles thereon and deposit said articles on said plate over said slot in the path of movement of said lugs, a pair of spaced rigid longitudinal wall members on said support structure extending upwardly from said plate, one on each side of said plate, a countershaft rotatably journalled in said walls transversely of said plate, a third sprocket keyed to said countershaft, an endless chain disposed over said second and third sprockets to transmit rotation of said first shaft to said countershaft, a gate pivotally mounted on said spaced wall members, a roller mounted on the lower end of said gate and normally disposed in the path of movement of an article being advanced on said conveying surface, an abutment member secured to the upper end of said gate, an actuating arm keyed to said countershaft and extending radially outwardly therefrom having an outer end movable into contact with said abutment member to pivot said gate and move said roller out of article-obstructing position during each revolution of said countershaft.

11. A device for controlling the movement of articles along a conveying surface comprising a support structure, a conveying surface adapted to support articles and move them along a predetermined path, a stationary housing mounted on said structure, a gate pivotally mounted on said housing, an article-contacting member mounted on the lower end of said gate and normally disposed in the path of articles moving along said conveying surface, an abutment member mounted on said gate, a shaft journalled in said housing adjacent said abutment member, means for rotating said shaft, and an arm keyed to said shaft and extending radially outwardly therefrom and having an end portion movable into contact with said abutment member as said shaft rotates, said arm and said abutment member being arranged so that contact by said arm lifts said gate out of the path of said articles.

12. In combination a conveying surface arranged to advance articles along a predetermined path, a stationary support structure adjacent said conveying surface and extending thereabove, a gate mounted on said support structure for movement in a generally vertical direction and having an article-contacting portion normally disposed in the path of articles being advanced on said conveying surface, an abutment member adjustably mounted on said gate, means defining a notch in said abutment member, a shaft journalled in said support structure adjacent said gate, an actuating arm keyed to said shaft and extending radially outwardly therefrom, said arm being arranged to contact said abutment member during each revolution of said shaft to move the article-contacting portion of said gate out of article-arresting position, and means for selectively moving said abutment member to align the notch therein with said arm whereby said arm will not contact said abutment arm to move said gate.

13. In combination, a support structure, a shaft journalled in said support structure, a sprocket keyed to said shaft, a power driven endless conveyor chain trained over said sprocket, a cam disc rotatably journalled on said shaft adjacent said sprocket, means for adjustably securing said cam disc to said sprocket, a conveying surface arranged to advance articles along a given path for discharge onto said endless conveyor chain, a stationary support housing on said support structure, a gate mounted for guided vertical movement in said housing, an article contacting roller on said gate disposed in the path of movement of articles being advanced on said conveying surface, a lever system operatively connected between said cam disc and said gate for lifting said gate to move said roller out of article-arresting position upon a predetermined angular rotation of said shaft.

14. A device for controlling the movement of articles along a conveying surface comprising a support structure, a conveying surface arranged to move articles along a fixed path, a stationary housing mounted on said support structure and having a transverse wall in spaced relation above said conveying surface, a gate mounted for guided vertical movement in said housing, an abutment member on said gate, an article contacting member mounted on the lower end of said gate and normally disposed in the path of movement of an article being advanced on said conveying surface, a lever pivotally mounted in said housing and having an end portion normally adjacent and below said abutment member, a latch pivotally mounted on said lever end portion and having a contact portion movable to a latching position below said abutment member, means for positively pivoting said latch to said latching position, means for stopping the pivotal movement of said latch in said latching position, means for pivoting said lever in one rotation to raise said latch into contact with said abutment member to raise said gate, said latch being movable in an arced path and out of contact with said abutment member after a predetermined lift of said gate, a spring disposed between said gate and said transverse wall of said housing arranged to be compressed as said gate is lifted and to urge said gate downwardly when said latch moves out of contact with said abutment member, and means for pivoting said lever in a rotation opposite to said one rotation to return said lever to normal position, the pivotal mounting of said latch on said lever permitting said latch to pass downwardly alongside said abutment member.

15. A conveying system comprising a conveyor arranged to move articles along a predetermined path in end to end relation, a spacing device adjacent said conveyor and having a movable portion adapted to contact the foremost article to arrest the forward movement of the line of articles being advanced by said conveyor, power means effective upon energization for moving said movable portion upwardly at equally spaced intervals from article arresting position to article releasing position, means including a high speed section of said conveyor disposed below said movable portion and arranged to receive and support the foremost article when said movable portion is in article arresting position for accelerating the foremost article away from the articles next behind immediately after release of the article by said movable portion, and means for de-energizing said power means to permit said movable portion to descend by gravity upon the upper surface of said foremost article and to move to article arresting position immediately after said foremost article has moved from under said movable portion.

16. In a conveying system, the combination of a first conveying surface arranged to advance articles along a given path, a second conveying surface disposed at a higher level than said first conveying surface and having a rear portion coextensive with the forward portion of said first conveying surface and arranged to receive articles from said first surface and lift them upwardly off said first surface, means for continuously moving said conveying surfaces, said second conveying surface having a speed greater than the speed of said first conveying surface, and movable stop means adjacent said second conveying surface and normally disposed to arrest the forward movement of articles on said conveying surfaces with the foremost article resting on said second conveying surface and the following articles disposed on said first conveying surface.

17. A device for controlling the movement of articles along a predetermined path comprising a support structure, a stationary housing supported upon said structure and having spaced upstanding side walls at either side of said path and a front wall connecting the side walls, a rod secured between said side walls near the rear end of said housing, a gate having a rearward portion pivotally mounted on said rod and a forward portion disposed adjacent said housing front wall, an article contacting member rotatably mounted at the lower end of said forward gate portion and normally disposed in the path of travel of an article being advanced to arrest the forward movement thereof, and a solenoid mounted on said housing above said forward gate portion and connected thereto and arranged to raise said gate by energization of said solenoid.

18. In a conveying system, the combination of a pair of parallel spaced conveyor belts arranged to advance an article disposed in spanning relation thereacross, a power driven endless chain disposed directly below the space between said conveyor belts, lugs spaced along the length of said endless chain and arranged when in the upper reach of said chain to extend upwardly through the space between said conveyor belts to a level above the level of said belts, and means for moving said conveyor belts at a faster linear speed than the linear speed of said chain whereby to move an article being advanced on said belts against the rear face of a lug on said chain.

References Cited in the file of this patent

UNITED STATES PATENTS

| | | |
|---|---|---|
| 137,224 | Mansfield | Mar. 25, 1873 |
| 814,943 | Cook | Mar. 13, 1906 |
| 1,319,190 | Houten | Oct. 21, 1919 |
| 2,403,673 | Mead | July 9, 1946 |
| 2,405,947 | Gettig | Aug. 20, 1946 |
| 2,528,868 | Dederich | Nov. 7, 1950 |
| 2,627,966 | Moyer | Feb. 10, 1953 |
| 2,714,440 | Forty | Aug. 2, 1955 |